(12) United States Patent
Itoi et al.

(10) Patent No.: US 8,421,422 B2
(45) Date of Patent: Apr. 16, 2013

(54) POWER SUPPLY DEVICE

(75) Inventors: Naoki Itoi, Chiyoda-ku (JP); Masayoshi Maeda, Aioi (JP); Nobuhiro Kihara, Chiyoda-ku (JP); Kenji Ishi, Chiyoda-ku (JP); Hiroshi Okuda, Chiyoda-ku (JP); Fumito Uemura, Chiyoda-ku (JP)

(73) Assignee: Mitsubishi Eletric Corporation, Tokyo (JP)

( * ) Notice: Subject to any disclaimer, the term of this patent is extended or adjusted under 35 U.S.C. 154(b) by 580 days.

(21) Appl. No.: 12/775,183

(22) Filed: May 6, 2010

(65) Prior Publication Data
US 2011/0101930 A1 May 5, 2011

(30) Foreign Application Priority Data
Oct. 29, 2009 (JP) .................................. 2009-249069

(51) Int. Cl.
*H02P 9/14* (2006.01)
(52) U.S. Cl.
USPC ............................................. 322/28; 322/37
(58) Field of Classification Search .................... 322/27, 322/28, 37, 59
See application file for complete search history.

(56) References Cited

U.S. PATENT DOCUMENTS

| | | | | |
|---|---|---|---|---|
| 5,739,677 A | * | 4/1998 | Tsutsui et al. | 322/25 |
| 6,160,384 A | * | 12/2000 | Inaba et al. | 322/59 |
| 6,555,993 B2 | * | 4/2003 | Taniguchi et al. | 322/28 |
| 6,737,835 B2 | * | 5/2004 | Taniguchi | 322/29 |
| 7,298,115 B2 | * | 11/2007 | Nishimura et al. | 322/28 |
| 2010/0289459 A1 | * | 11/2010 | Kihara et al. | 322/7 |
| 2011/0286251 A1 | * | 11/2011 | Itoi et al. | 363/126 |

FOREIGN PATENT DOCUMENTS

| | | |
|---|---|---|
| JP | 6-46195 A | 1/1991 |
| JP | 03-026298 U | 3/1991 |
| JP | 2530219 Y2 | 7/1991 |
| JP | 4100793 B2 | 7/2000 |
| JP | 2003-189697 A | 7/2003 |

OTHER PUBLICATIONS

Japanese Office Action dated Nov. 8, 2011 in corresponding Japanese Application No. 2009-249069.

* cited by examiner

*Primary Examiner* — Nicholas Ponomarenko
(74) *Attorney, Agent, or Firm* — Sughrue Mion, PLLC

(57) ABSTRACT

A power supply device comprising: a magneto generator including a rotor including a magnet forming a magnetic field; a rectifying unit rectifying an alternating current of the generator to a direct current and supplying to an electrical load; a voltage detection unit detecting a voltage of the electrical load; an opening unit interrupting electrical conduction of an output of the generator; short-circuiting units electrically short-circuiting the output; a torque supplying device supplying torque to the rotor; a voltage control unit selectively performing one of opening-control of controlling on/off switching of the opening unit and short-circuit-control of controlling on/off switching of the short-circuiting units to control the voltage of the electrical load to a predetermined value in accordance with the voltage detected by the voltage detection unit; a switching control unit switching and controlling between the above two controls in accordance with an operating state regarding rotation of the rotor.

20 Claims, 4 Drawing Sheets

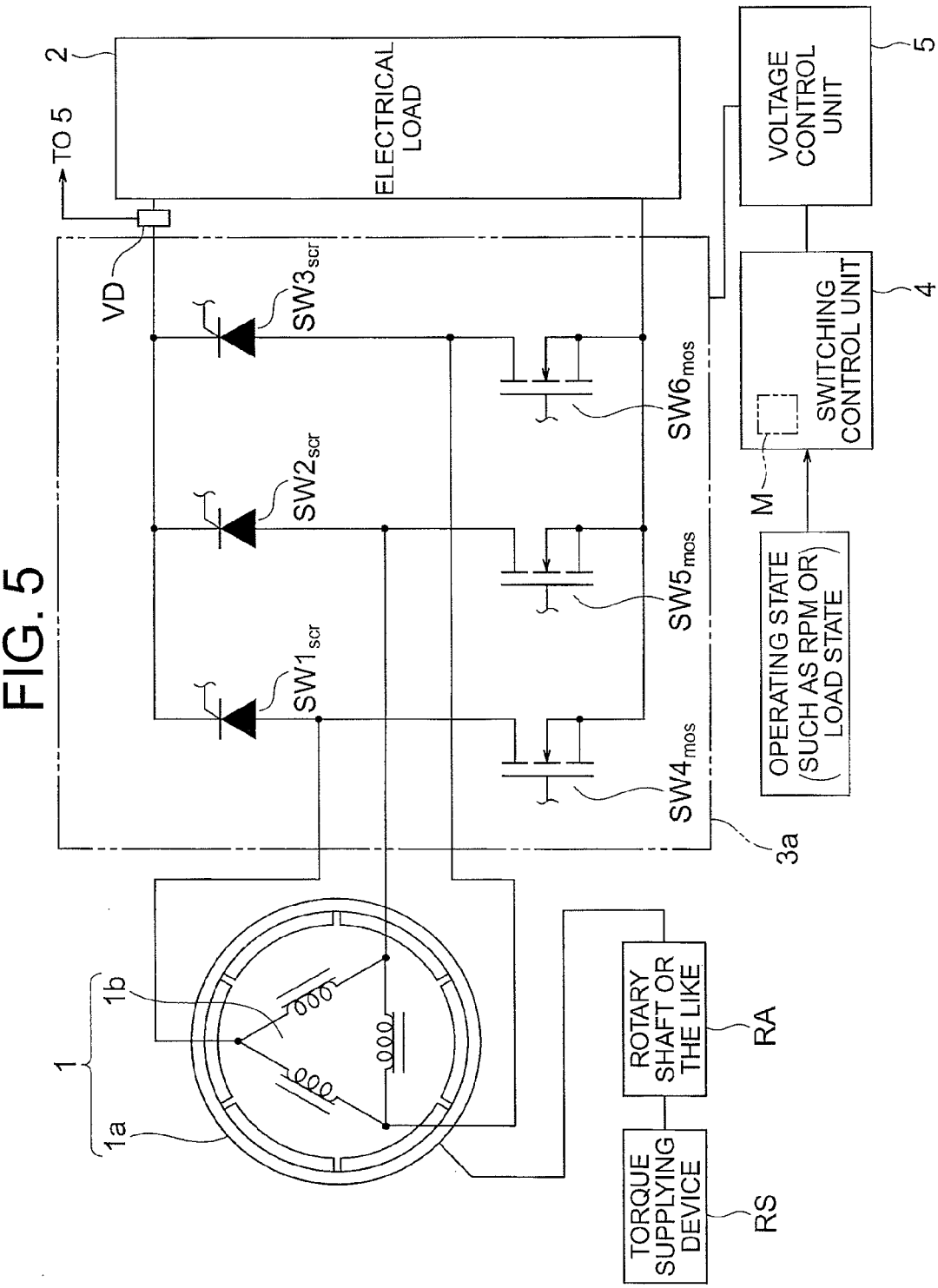

POWER SUPPLY DEVICE

BACKGROUND OF THE INVENTION

1. Field of the Invention

The present invention relates to a power supply device using a magneto alternating current (AC) generator.

2. Description of the Related Art

As a power supply device, there is conventionally known, for example, a power supply device using a magneto AC generator disclosed in each of Japanese Patent No. 4100793, Japanese Utility Model Registration No. 2076397, and Japanese Utility Model Registration No. 2530219. Such power supply device generally includes a magneto AC generator, a rectifier circuit, and a generated voltage control circuit. Electric power generated by the magneto AC generator is converted into a direct current (DC) by the rectifier circuit, and then input to the generated voltage control circuit. The generated voltage control circuit performs short-circuit control or opening control so as to obtain a voltage in accordance with a voltage of an electrical load formed of, for example, an electrical storage device, and then the electric power is supplied to the electrical load.

In the conventional power supply device using the magneto AC generator, the opening control and the short-circuit control are independently controlled as voltage control. Input torque to a rotor of the magneto AC generator from a torque supplying device (engine in a case of automobile), which supplies torque to the rotor, differs depending on rpm of the rotor. For this reason, the generator of the conventional power supply device does not necessarily generate power with input torque most suitable for an operating state of the rotor or the torque supplying device.

Further, during an opening operation, a no-load induced voltage is generated at an output end of the magneto AC generator. The no-load induced voltage is proportional to the rpm of the rotor, and becomes the maximum at the actual maximum rpm. Therefore, the power supply device including the magneto AC generator needs to be designed in terms of withstand voltage in expectation of the no-load induced voltage generated at the actual maximum rpm. For this reason, an element with high withstand voltage must be selected, which leads to an increased size and cost of the power supply device. In recent years, the magneto AC generator has a tendency to increase its output, and hence the no-load induced voltage generated in the magneto AC generator is becoming increasingly larger, which requires the design for higher withstand voltage.

SUMMARY OF THE INVENTION

The present invention has been made to solve the problem described above, and therefore it is an object thereof to provide a power supply device using a magneto AC generator, which is capable of improving power generation efficiency compared with a conventional one by switching voltage control between opening control and short-circuit control of an output end of the magneto AC generator in accordance with an operating state of a rotor or a torque supplying device so that input torque to the magneto AC generator may be reduced to reduce an operating load on the torque supplying device and to suppress energy necessary for rotating the rotor for power generation.

The present invention provides a power supply device including: a magneto generator, which includes: a rotor including a magnet forming a magnetic field; and a stator which generates an alternating current in stator windings by rotation of the rotor; a rectifying unit which rectifies the alternating current generated by the magneto generator to a direct current, and supplies electric power to an electrical load; a voltage detection unit which detects a voltage of the electrical load; opening means for interrupting electrical conduction of an output end of the magneto generator; short-circuiting means for electrically short-circuiting the output end of the magneto generator; a torque supplying device which supplies torque to the rotor of the magneto generator; a voltage control unit which selectively performs one of opening control of controlling on/off switching of the opening means and short-circuit control of controlling on/off switching of the short-circuiting means, to thereby control the voltage of the electrical load to a predetermined value in accordance with the voltage detected by the voltage detection unit; and a switching control unit which switches and controls between the opening control and the short-circuit control in accordance with an operating state regarding the rotation of the rotor of the magneto generator.

According to the power supply device of the present invention, the opening control and the short-circuit control are switched over in accordance with the operating state of the rotor or the torque supplying device so that the input torque to the magneto generator may be reduced to reduce the operating load on the torque supplying device and to suppress energy necessary for rotating the rotor for power generation. Therefore, power generation efficiency may be improved compared with a conventional one.

BRIEF DESCRIPTION OF THE DRAWINGS

In the accompanying drawings:

FIG. 5 is a diagram illustrating an overall structure of a power supply device according to a third embodiment of the present invention.

DETAILED DESCRIPTION OF THE PREFERRED EMBODIMENTS

Hereinafter, a power supply device according to the present invention is described by way of respective embodiments with reference to the accompanying drawings.

First Embodiment

Figure 1:
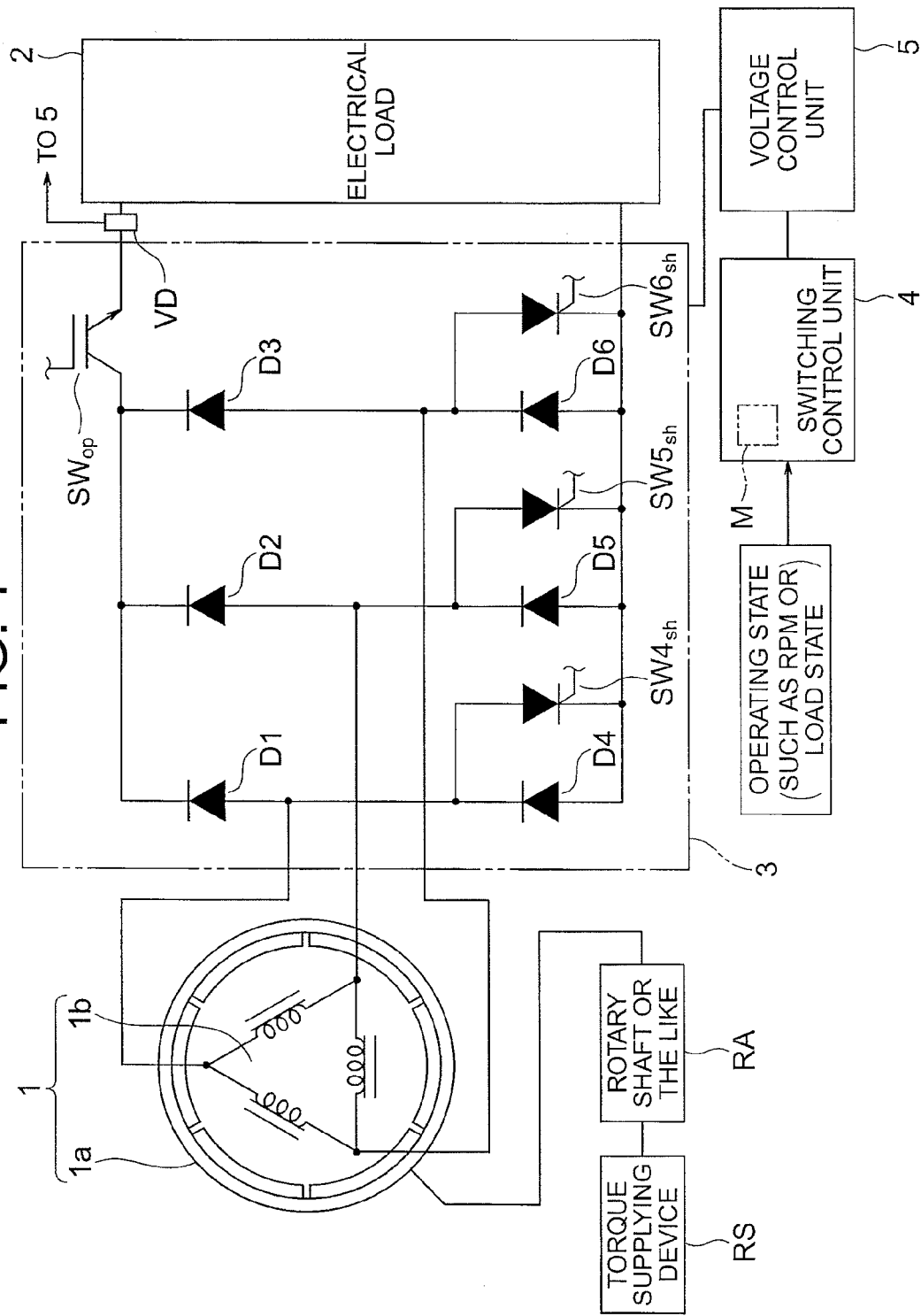
FIG. 1 is a diagram illustrating an overall structure of a power supply device according to a first embodiment of the present invention.

FIG. 1 is a diagram illustrating an overall structure of a power supply device according to a first embodiment of the present invention. The power supply device according to the first embodiment includes a magneto (AC) generator 1, a rectifying unit 3 which rectifies an alternating current generated by the magneto generator 1 to a direct current, an electrical load 2 to which electric power of the direct current rectified by the rectifying unit 3 is supplied, a voltage detection unit VD formed of a voltmeter for determining a voltage of the electrical load 2, opening means $SW_{op}$, which is provided in the rectifying unit 3, for interrupting electrical conduction between an output end of the magneto generator 1 (in this embodiment, an output on a positive wave side of the rectifying unit 3) and the electrical load 2, short-circuiting means $SW4_{sh}$ to $SW6_{sh}$, which are provided in the rectifying unit 3, for electrically short-circuiting the output end of the magneto generator 1, a voltage control unit 5 which selectively performs one of opening control for controlling switching of the opening means $SW_{op}$ provided in the rectifying unit 3 (controlling on/off of the opening means $SW_{op}$) and short-circuit control for controlling switching of the short-circuiting means $SW4_{sh}$ to $SW6_{sh}$ provided in the rectifying unit 3 (controlling on/off of the short-circuiting means $SW4_{sh}$ to $SW6_{sh}$) to thereby control the voltage of the electrical load to a predetermined value in accordance with the detected voltage of the electrical load 2, and a switching control unit 4 which causes the voltage control unit 5 to perform the control switching between the opening control and the short-circuit control in accordance with an operating state, such as rpm of a rotor 1a or an operating load state of a torque supplying device, predetermined switching control information stored in advance in a memory M serving as storage means, and the like.

The magneto generator 1 is formed of the rotor 1a and a stator 1b. The rotor 1a includes magnetic field magnets divided into a plurality of pieces toward an inside of a cylindrical supporting member along its rotation direction (circumferential direction). The stator 1b includes stator windings which are delta-connected. The rotor 1a is connected to a rotary shaft RA which transmits rotation of a torque supplying device RS. For example, in a case of an on-vehicle power supply device, the torque supplying device RS is an internal combustion engine (engine), and the rotor 1a is directly coupled to a crank shaft of the internal combustion engine or is connected to the rotary shaft RA which is connected to the crank shaft via a belt, a gear, or the like. When the rotor 1a rotates along with the rotation of the rotary shaft RA, an alternating current is generated in the stator windings of the stator 1b. The alternating current generated in the stator 1b is rectified to a direct current by a three-phase diode bridge formed by six diodes D1 to D6 provided in the rectifying unit 3.

The electrical load 2 is supplied with the electric power of the direct current rectified by the rectifying unit 3, and is formed of an electrical load device, whose electrical load (power consumption) varies, such as a sensor or an electronic device (ECU), an electrical storage device, or the like.

In the three-phase diode bridge provided in the rectifying unit 3, the single and common switching element $SW_{op}$ (opening means) is provided in series between respective cathode terminals of the diodes D1 to D3 on the positive wave side of the rectifying unit 3 and an input terminal of the electrical load 2. In a case where the voltage of the electrical load 2 is equal to or larger than a predetermined value, the voltage control unit 5 controls the switching element $SW_{op}$ to be turned off so that the electrical conduction between the output end of the magneto generator 1 and the electrical load 2 may be interrupted. On the other hand, in a case where the voltage of the electrical load 2 is less than the predetermined value, the switching element $SW_{op}$ is turned on so that the direct current may be supplied to the electrical load 2 via the three-phase diode bridge provided in the rectifying unit 3. In this way, the voltage of the electrical load 2 is adjusted to the predetermined value. Such control as described above is referred to as the opening control.

Further, in the three-phase diode bridge provided in the rectifying unit 3, between respective input terminals for three phases which receive input from the magneto generator 1 and respective anode terminals of the diodes D4 to D6 on a negative wave side, the thyristors $SW4_{sh}$, $SW5_{sh}$, and $SW6_{sh}$ (short-circuiting means) are provided with a direction from the respective input terminals for three phases to the respective anode terminals of the diodes D4 to D6 on the negative wave side being as a forward direction. In the case where the voltage of the electrical load 2 is equal to or larger than a predetermined value, the voltage control unit 5 controls respective gate signals of the thyristors $SW4_{sh}$, $SW5_{sh}$, and $SW6_{sh}$ to be turned on so that the output end of the magneto generator 1 may be electrically short-circuited (returned). On the other hand, in the case where the voltage of the electrical load 2 is less than the predetermined value, the respective gate signals of the thyristors $SW4_{sh}$, $SW5_{sh}$, and $SW6_{sh}$ are turned off so that the direct current may be supplied to the electrical load 2 via the three-phase diode bridge provided in the rectifying unit 3. In this way, the voltage of the electrical load 2 is adjusted to the predetermined value. Such control as described above is referred to as the short-circuit control.

The switching control unit 4 causes the voltage control unit 5 to switch the voltage control between the opening control and the short-circuit control in accordance with a signal indicating an operating state of the magneto generator 1 or the torque supplying device RS, such as the rpm of the rotor 1a. Note that there is an rpm signal sent from an rpm sensor (not shown) for the rotor 1a as the signal indicating the operating state. Further, in a case where the power supply device is mounted on a vehicle, an example of the signal indicating the operating state is an rpm signal which is obtained by an rpm sensor (not shown) indicating rpm of the crank shaft of the internal combustion engine to which the rotor 1a is coupled or by an electronic control device (not shown) for the internal combustion engine.

Figure 2:
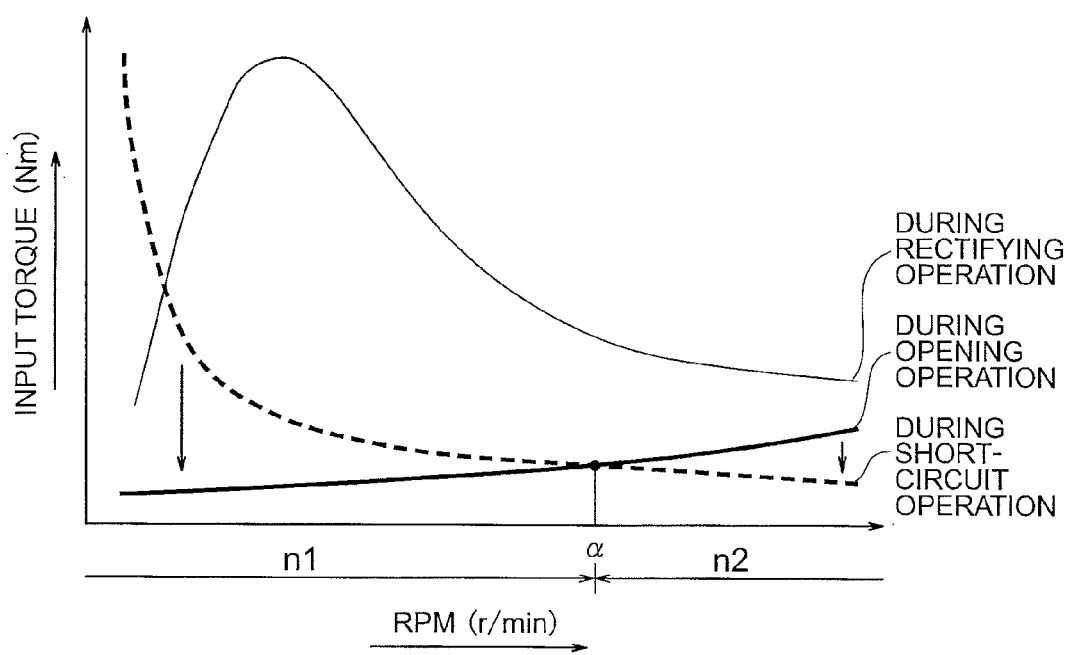
FIG. 2 is a graph illustrating a relationship between rpm and input torque to a magneto generator according to the first embodiment of the present invention.

FIG. 2 illustrates characteristics of input torque to the magneto generator 1 with respect to the rpm of the rotor 1a according to various methods of controlling the voltage of the electrical load 2. When it is assumed in FIG. 2 that rpm of an intersection between the input torque during an opening operation and the input torque during a short-circuit operation is α, the input torque (input energy) becomes the minimum during the opening operation in an area n1 in which the rpm is less than α. On the other hand, the input torque (input energy) becomes the minimum during the short-circuit operation in an area n2 in which the rpm is equal to or larger than α. For this reason, the switching control unit 4 switches and controls between the opening control and the short-circuit control so as to obtain the minimum input torque, to thereby reduce the input torque to the magneto generator 1. As a result, a load on the torque supplying device RS is reduced, and in a case where the torque supplying device RS is an internal combustion engine, fuel efficiency and the like may be improved.

Specifically, the switching control unit 4 stores in advance, in the memory M, switching control information which contains switching information indicating relationships between the rpm of the rotor 1a and a magnitude relation of the input torque to the magneto generator 1 from the torque supplying device RS during the opening control and the short-circuit control (stores the rpm α), for example, as illustrated in FIG. 2. Then, the above-mentioned two types of control are switched over such that, for example, the opening control is performed by the opening means in the case where the rpm is less than α while the short-circuit control is performed by the short-circuiting means in the case where the rpm is equal to or larger than α. Further, while monitoring a detection voltage of the voltage detection unit VD, the voltage control unit 5 controls the voltage of the electrical load 2 to a predetermined value as a control target value through one of the above-mentioned two types of control. Note that, when the rotor 1a has the rpm at which the input torque to the magneto generator 1 in the case of the opening control and the input torque in the case of the short-circuit control are equal to each other, for example, the current control may be maintained without performing the control switching.

As the operating state regarding the rotation of the rotor 1a of the magneto generator 1, the switching control unit 4 receives a signal indicating the operating load state of the torque supplying device RS. In a case where the operating load state of the torque supplying device RS is determined to be a high load state (for example, during accelerating or climbing), the voltage control of the rectifying unit 3 is switched and controlled by the switching control unit 4 depending on the above-mentioned rpm areas n1 and n2 to the opening control (in the n1 area) and the short-circuit control (in the n2 area), respectively. Accordingly, the input torque to the magneto generator 1 may be reduced, which enables a reduction in load on the torque supplying device RS. In a case where the torque supplying device RS is used as an internal combustion engine of a vehicle, accelerating performance and climbing performance may be improved.

On the other hand, in a case where the operating load state of the torque supplying device RS is determined to be a low load state (for example, during decelerating, idling, or descending), the voltage control of the rectifying unit 3 is switched and controlled by the switching control unit 4 depending on the above-mentioned rpm areas n1 and n2 to the short-circuit control (in the n1 area) and the opening control (in the n2 area), respectively. Accordingly, the input torque to the magneto generator 1 may be increased, which enables an increase in load on the torque supplying device RS. In the case where the torque supplying device RS is used as an internal combustion engine of a vehicle, braking performance at the time of decelerating may be improved.

Note that, in the case where the torque supplying device RS is an internal combustion engine as described above, in order to determine the operating load state, for example, the switching control unit 4 receives at least one of a signal indicating an internal pressure of an intake pipe of the internal combustion engine, a signal indicating a throttle opening of the internal combustion engine, and a signal indicating a temperature of cooling water for cooling the internal combustion engine, which are obtained from an electronic control device for the internal combustion engine or the like, to thereby determine the operating load state based on one or a combination of a plurality of those signals.

Figure 3:
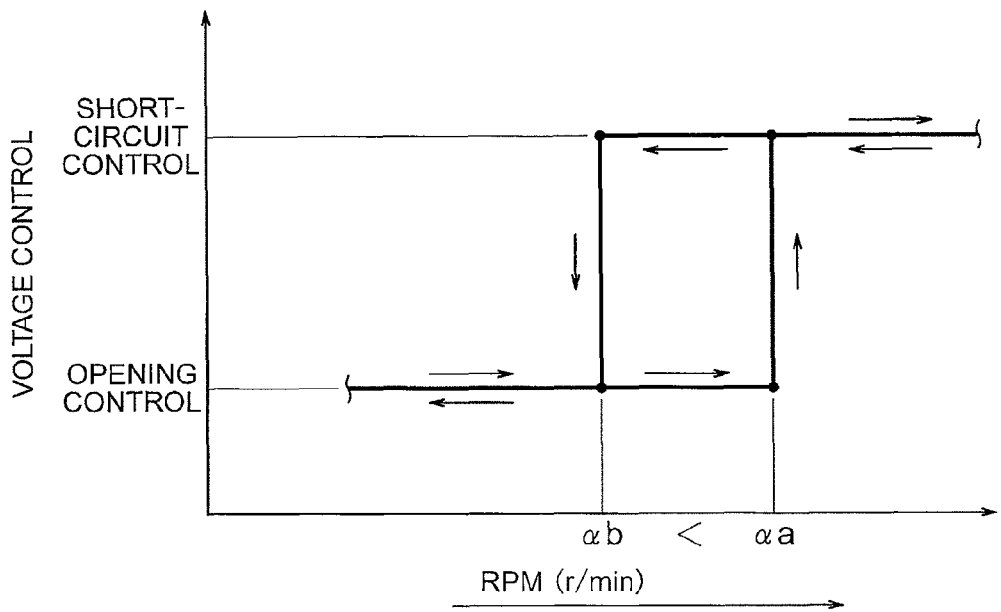
FIG. 3 is a graph illustrating a relationship between the rpm and voltage control according to the first embodiment of the present invention.

Further, as illustrated in FIG. 3, chattering due to minute fluctuations in rotation may be prevented when hysteresis is provided to a timing at which the voltage control is switched between when the rpm increases and when the rpm decreases. In FIG. 3, a horizontal axis represents the rpm of the rotor 1a, and a vertical axis represents the voltage control. As illustrated in FIG. 3, when it is assumed that the rpm at which the voltage control is switched from the opening control to the short-circuit control is αa, and that the rpm at which the voltage control is switched from the short-circuit control to the opening control is αb, αa is larger than αb. When the hysteresis is provided to the timing at which the voltage control is switched between when the rpm increases and when the rpm decreases, chattering due to minute fluctuations in rotation may be prevented. Note that, in the case where the hysteresis is provided to the timing at which the voltage control is switched, the switching control unit 4 stores in advance, in the memory M, the above-mentioned switching information (rpm αa and αb) for rpm increase and for rpm decrease (the same shall apply hereinafter).

Still further, the above-mentioned switching information may be a table indicating the magnitude relation of the input torque during the short-circuit control and the opening control and the respective areas thereof in the form of a range of the rpm. As to the switching information, the relationship between the rpm of the rotor 1a and the input torque (Nm) to the magneto generator 1, which is illustrated in, for example, FIG. 2, is obtained in advance through measurement or the like, and a table is created based on the relationship and stored in the memory M of the switching control unit 4 as the switching control information.

Second Embodiment

An overall structure of a power supply device according to a second embodiment of the present invention is basically the same as that of the first embodiment illustrated in FIG. 1.

Figure 4:
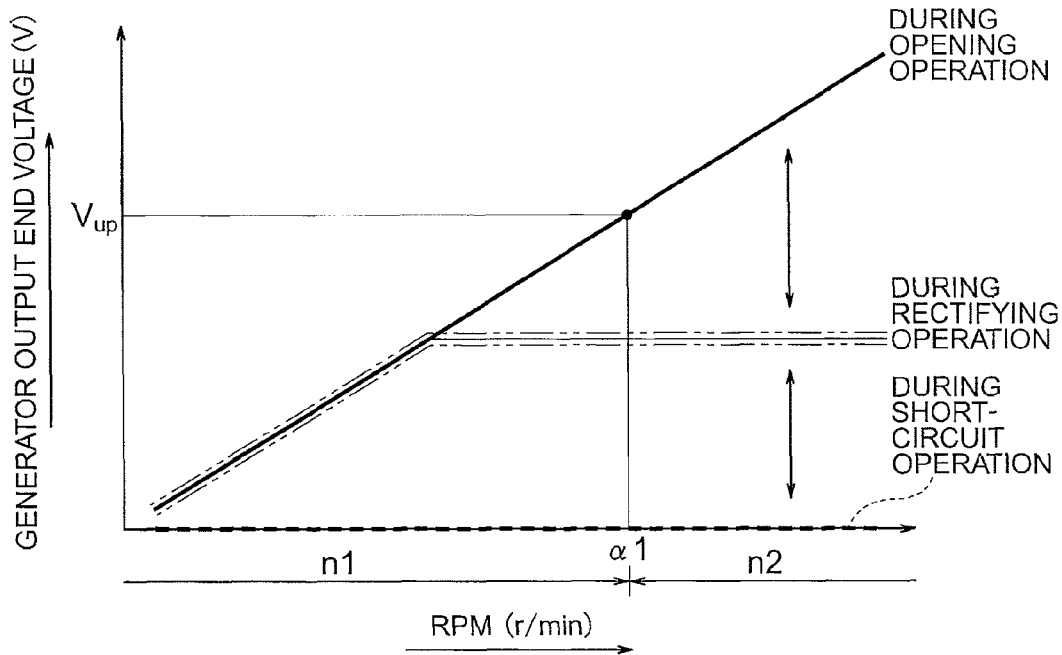
FIG. 4 is a graph illustrating a relationship between rpm and a generator output end voltage according to a second embodiment of the present invention.

FIG. 4 illustrates characteristics of a generator output end voltage with respect to the rpm of the rotor 1a according to various methods of controlling the voltage of the electrical load 2. During the opening operation, a no-load induced voltage is generated at the output end of the magneto generator 1. As illustrated in FIG. 4, the no-load induced voltage is proportional to the rpm of the rotor 1a, and becomes the maximum at the actual maximum rpm. For this reason, in FIG. 4, in an area in which the generator output end voltage during the opening operation is less than a predetermined value $V_{up}$, the voltage of the electrical load 2 is controlled by the opening control. On the other hand, in an area in which the generator output end voltage is equal to or larger than the predetermined value $V_{up}$, the voltage control is switched and controlled from the opening control to the short-circuit control. Accordingly, compared with a case where the voltage control is performed by the opening control until the actual maximum rpm, an element with a lower withstand voltage may be used to constitute the power supply device including the magneto generator 1, and hence a size, weight, and cost of the power supply device may be reduced. The predetermined value $V_{up}$ is set in comprehensive consideration of normal actual rpm, a withstand voltage, size, and cost of elements, the input torque to the magneto generator 1 illustrated in FIG. 2, and the like.

In order to realize the operation described above, as to the magneto generator 1, the relationship between the rpm of the rotor 1a and the generator output end voltage (V) of the magneto generator 1, which is illustrated in FIG. 4, is obtained in advance through measurement or the like, and a table indicating the relationship between the rpm of the rotor 1a and the generator output end voltage, which is based on the above-mentioned relationship, is stored in advance in the memory M of the switching control unit 4 as switching control information (rpm α1). Then, when the rpm of the rotor 1a is input to the switching control unit 4, the switching control unit 4 performs the switching of the voltage control between the opening control and the short-circuit control in accordance with the table. Further, in the case where hysteresis is provided to the above-mentioned timing at which the voltage control is switched, a table, which indicates a relationship between the rpm of the rotor for rpm increase and for rpm decrease and the voltage control, may be stored in advance.

Note that, as to such information, only the rpm of α1 of the rotor 1a at which the opening control and the short-circuit control are switched over with the generator output end voltage of the predetermined value $V_{up}$ (including the rpm for rpm increase and for rpm decrease in the case where hysteresis is provided), which is based on, for example, FIG. 4, may be stored in the memory M of the switching control unit 4 as the switching information.

Third Embodiment

FIG. 5 is a diagram illustrating an overall structure of a power supply device according to a third embodiment of the present invention. In the power supply device according to this embodiment, as illustrated by a rectifying unit 3a of FIG. 5, thyristors $SW1_{scr}$, $SW2_{scr}$, and $SW3_{scr}$, which have a rectifying function and also serve as opening means, are provided in place of the diodes D1 to D3 on the positive wave side of the three-phase diode bridge. In addition, transistors $SW4_{mos}$, $SW5_{mos}$, and $SW6_{mos}$ formed of MOSFETs, which have a rectifying function and also serve as short-circuiting means, are provided in place of the diodes D4 to D6 on the negative wave side. With the structure described above, the rectifying unit and the short-circuiting means may be formed integrally together. Note that an operation, a control, and the like of the power supply device are identical with those described above in each of the above-mentioned embodiments.

Note that, in each of the above-mentioned embodiments, the respective items of the switching control information are stored in the memory M of the switching control unit 4. However, the present invention is not limited thereto, and a comparator circuit (not shown) formed of, for example, an FV converter and a comparator may be provided so that an external rpm signal may be subjected to frequency/voltage conversion and compared with a reference voltage indicating the predetermined rpm $\alpha$, $\alpha a$, $\alpha b$, $\alpha 1$, or the like, to thereby output a control signal for control switching to the voltage control unit 5.

Further, the present invention is not limited to each of the above-mentioned embodiments and encompasses any possible combination of those embodiments.

According to the power supply device of the present invention, the opening operation of interrupting the electrical conduction between the output end of the magneto generator and the electrical load and the short-circuit operation of electrically short-circuiting the output end of the magneto generator are switched over in accordance with the operating state so that the input torque to the magneto generator in accordance with the operating state may be reduced to reduce the operating load on the torque supplying device, which supplies torque to the magneto generator, and to suppress energy necessary for rotating the rotor for power generation. Therefore, power generation efficiency may be improved compared with a conventional one.

What is claimed is:

1. A power supply device, comprising:
   a magneto generator, which includes:
      a rotor including a magnet forming a magnetic field; and
      a stator which generates an alternating current in stator windings by rotation of the rotor;
   a rectifying unit which rectifies the alternating current generated by said magneto generator to a direct current, and supplies electric power to an electrical load;
   a voltage detection unit which detects a voltage of the electrical load;
   opening means for interrupting electrical conduction of an output end of said magneto generator;
   short-circuiting means for electrically short-circuiting the output end of said magneto generator;
   a torque supplying device which supplies torque to the rotor of said magneto generator;
   a voltage control unit which selectively performs one of opening control of controlling on/off switching of said opening means and short-circuit control of controlling on/off switching of said short-circuiting means, to thereby control the voltage of the electrical load to a predetermined value in accordance with the voltage detected by said voltage detection unit; and
   a switching control unit which switches and controls between the opening control and the short-circuit control in accordance with an operating state regarding the rotation of the rotor of said magneto generator.

2. The power supply device according to claim 1, wherein said switching control unit is configured to:
   receive a signal indicating rpm on a side of the rotor as the operating state regarding the rotation of the rotor of said magneto generator; and
   based on switching control information which contains switching information indicating relationships between the rpm on the side of the rotor and a magnitude relation of input torque to said magneto generator from said torque supplying device during the opening control and the short-circuit control, switch between the opening control and the short-circuit control in accordance with the rpm on the side of the rotor so that the input torque to said magneto generator becomes smaller.

3. The power supply device according to claim 2, wherein said switching control unit is configured to:
   receive a signal indicating an operating load state of said torque supplying device as the operating state regarding the rotation of the rotor of said magneto generator; and
   when said torque supplying device is in a high load state, switch between the opening control and the short-circuit control in accordance with the rpm on the side of the rotor so that the input torque to said magneto generator becomes smaller.

4. The power supply device according to claim 2, wherein said switching control unit is configured to:
   receive a signal indicating an operating load state of said torque supplying device as the operating state regarding the rotation of the rotor of said magneto generator; and
   when said torque supplying device is in a low load state, switch between the opening control and the short-circuit control in accordance with the rpm on the side of the rotor so that the input torque to said magneto generator becomes larger.

5. The power supply device according to claim 3, wherein:
   said torque supplying device comprises an internal combustion engine;
   the signal indicating the operating load state of said torque supplying device includes at least one of signals indicating an internal pressure of an intake pipe, a throttle opening, and a temperature of cooling water of the internal combustion engine; and
   the operating load state is determined based on one or a combination of a plurality of the signals.

6. The power supply device according to claim 4, wherein:
   said torque supplying device comprises an internal combustion engine;
   the signal indicating the operating load state of said torque supplying device includes at least one of signals indicating an internal pressure of an intake pipe, a throttle opening, and a temperature of cooling water of the internal combustion engine; and
   the operating load state is determined based on one or a combination of a plurality of the signals.

7. The power supply device according to claim 1, wherein said switching control unit is configured to:

receive a signal indicating rpm on a side of the rotor as the operating state regarding the rotation of the rotor of said magneto generator; and based on switching control information which contains switching information indicating the rpm on the side of the rotor at which a no-load induced voltage, which is generated in said magneto generator during opening by the opening control, becomes equal to or larger than a predetermined value, select the opening control when the rpm is less than the rpm on the side of the rotor indicated by the switching information, and select the short-circuit control when the rpm is equal to or larger than the rpm on the side of the rotor indicated by the switching information.

8. The power supply device according to claim 2, wherein the rpm on the side of the rotor includes rpm of the rotor.

9. The power supply device according to claim 1, wherein the opening control and the short-circuit control are switched over at a timing to which hysteresis is provided between when the rpm increases and when the rpm decreases.

10. The power supply device according to claim 2, wherein the opening control and the short-circuit control are switched over at a timing to which hysteresis is provided between when the rpm increases and when the rpm decreases.

11. The power supply device according to claim 3, wherein the opening control and the short-circuit control are switched over at a timing to which hysteresis is provided between when the rpm increases and when the rpm decreases.

12. The power supply device according to claim 4, wherein the opening control and the short-circuit control are switched over at a timing to which hysteresis is provided between when the rpm increases and when the rpm decreases.

13. The power supply device according to claim 1, wherein:
   said rectifying unit comprises a three-phase diode bridge, which includes diodes on a positive wave side and diodes on a negative wave side;
   said opening means comprises a single switching element which is provided in series in common between respective cathode terminals of the diodes on the positive wave side of the three-phase diode bridge and the electrical load; and
   said short-circuiting means comprises three thyristors which are connected reversely in parallel with the diodes on the negative wave side, respectively.

14. The power supply device according to claim 2, wherein:
   said rectifying unit comprises a three-phase diode bridge, which includes diodes on a positive wave side and diodes on a negative wave side;
   said opening means comprises a single switching element which is provided in series in common between respective cathode terminals of the diodes on the positive wave side of the three-phase diode bridge and the electrical load; and
   said short-circuiting means comprises three thyristors which are connected reversely in parallel with the diodes on the negative wave side, respectively.

15. The power supply device according to claim 3, wherein:
   said rectifying unit comprises a three-phase diode bridge, which includes diodes on a positive wave side and diodes on a negative wave side;
   said opening means comprises a single switching element which is provided in series in common between respective cathode terminals of the diodes on the positive wave side of the three-phase diode bridge and the electrical load; and
   said short-circuiting means comprises three thyristors which are connected reversely in parallel with the diodes on the negative wave side, respectively.

16. The power supply device according to claim 4, wherein:
   said rectifying unit comprises a three-phase diode bridge, which includes diodes on a positive wave side and diodes on a negative wave side;
   said opening means comprises a single switching element which is provided in series in common between respective cathode terminals of the diodes on the positive wave side of the three-phase diode bridge and the electrical load; and
   said short-circuiting means comprises three thyristors which are connected reversely in parallel with the diodes on the negative wave side, respectively.

17. The power supply device according to claim 1, wherein:
   said opening means and said short-circuiting means are included in said rectifying unit; and
   said rectifying unit comprises a three-phase bridge, which includes:
     thyristors on a positive wave side; and
     MOSFETs on a negative wave side.

18. The power supply device according to claim 2, wherein:
   said opening means and said short-circuiting means are included in said rectifying unit; and
   said rectifying unit comprises a three-phase bridge, which includes:
     thyristors on a positive wave side; and
     MOSFETs on a negative wave side.

19. The power supply device according to claim 3, wherein:
   said opening means and said short-circuiting means are included in said rectifying unit; and
   said rectifying unit comprises a three-phase bridge, which includes:
     thyristors on a positive wave side; and
     MOSFETs on a negative wave side.

20. The power supply device according to claim 4, wherein:
   said opening means and said short-circuiting means are included in said rectifying unit; and
   said rectifying unit comprises a three-phase bridge, which includes:
     thyristors on a positive wave side; and
     MOSFETs on a negative wave side.

* * * * *